Patented Feb. 28, 1939

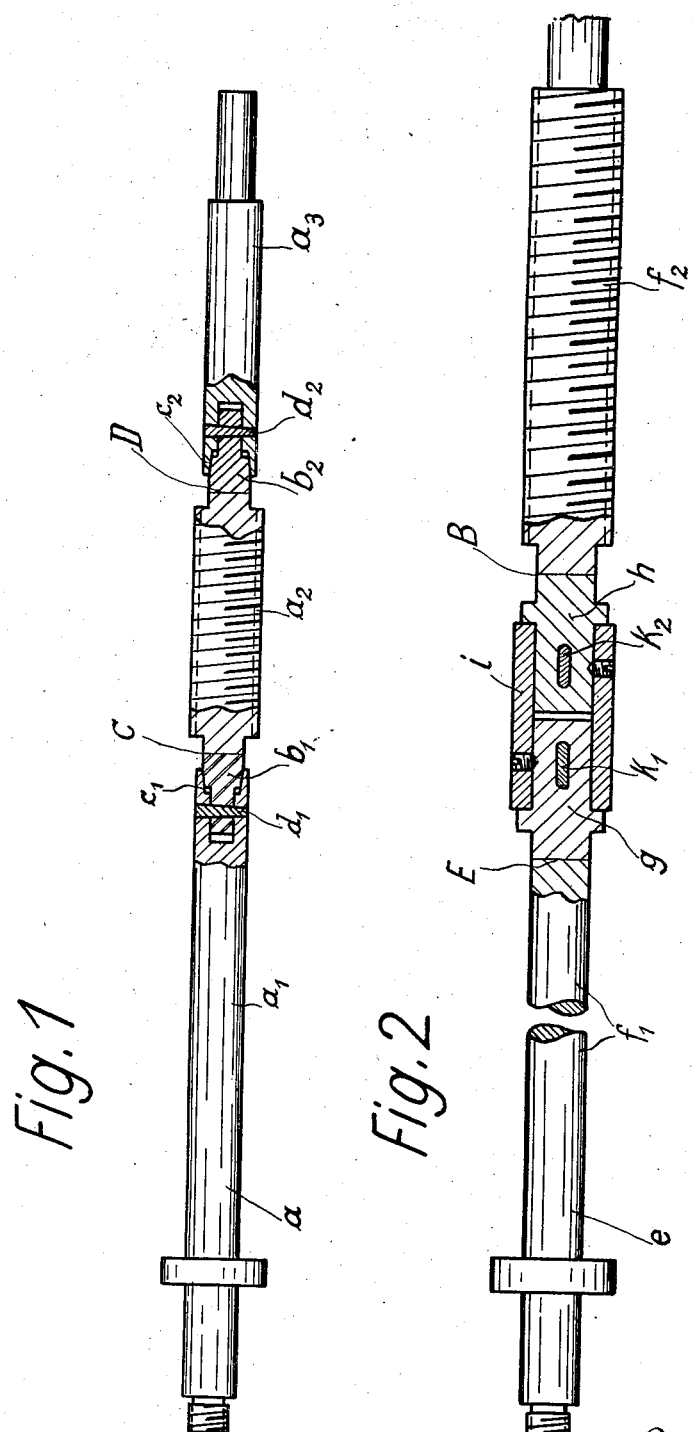

2,149,194

UNITED STATES PATENT OFFICE 2,149,194

SCREW-THREADED SPINDLE AND METHOD OF MAKING SAME

Robert Stopp, Berlin-Charlottenburg, Germany, assignor to Herbert Lindner, Berlin-Wittenau, Germany Application May 28, 1937, Serial No. 145,378
In Germany October 7, 1936

7 Claims. (Cl. 64—1)

This invention relates to hardened and ground screw-threaded rods or spindles of considerable length, the shafts of which are provided with screw-threads on portions or zones only of their total length, and has for its object to provide an improved construction of spindle of this character.

Hitherto such spindles of limited length (about 1200 m. m.) have been constructed in a single piece of hardenable steel but being of small diameter relative to their length were, naturally, rendered very rigid during hardening and made straightening difficult which generally had to be repeated between the preliminary and final grinding, in order to overcome the distortion of the spindle brought about during the operation by the release of stress. The production of such spindles was therefore slow and expensive and required the use of a screw-thread grinding machine of large dimensions which could not be economically utilized to its full capacity, since a machine of the required long distance between centres was necessary, while the correspondingly long working stroke available could only be inefficiently made use of, owing to the relatively short axial length of the screw-thread to be machined.

According to the invention, these disadvantages are overcome by not constructing the long screw-threaded spindle in a single piece, each screw-threaded sectional length or part which is to be hardened and ground being manufactured separately from the rest of the spindle shaft and being provided at one or both ends with coupling pieces which remain soft after the hardening and thus permit a mechanical connection of the screw-threaded section or parts to the remaining part of the spindle. The latter likewise comprises, inasmuch as it is to be hardened, coupling pieces which remain soft after the hardening process.

Each of the coupling pieces is suitably formed from low carbon steel and is connected by welding to the spindle section or part which is formed of high carbon steel. In cases in which the part of the spindle shaft not provided with screw-threads is to remain unhardened, this portion may also be formed from low quality steel and only the part of the spindle bearing the screw-threads need be of high quality hardenable steel. The expensive, high quality constructional material need then only be provided for those parts where it will actually be used. Thus, in many cases, a saving of expensive working materials is effected which is important from economical considerations.

With the foregoing and other objects in view, the invention consists in the details of construction, and in the arrangement and combination of parts to be hereinafter more fully set forth and claimed.

In describing the invention in detail, reference will be had to the accompanying drawing forming part of this application, wherein like characters denote corresponding parts in the several views, and in which—

Figure 1 illustrates a view in elevation, partly in section, of a spindle illustrating one embodiment of the invention; and Figure 2 illustrates a view in elevation, partly in section, illustrating a modification.

In this drawing, $a$ indicates a long sectional spindle shown in Figure 1 as comprising three parts, viz: two cylindrical end portions $a_1$ and $a_3$ and a centre portion $a_2$ provided with a screw-thread. The latter is provided at both ends with coupling pieces $b_1$ and $b_2$ which, for example, are formed as plugs comprising a cylindrical as well as a coned part and which are welded to the portion $a_2$ as indicated at C and D, respectively. These fit within corresponding bores $c_1$ and $c_2$ in the spindle portions $a_1$ and $a_3$ and the connection for rotation is effected on the one hand by the coned parts of the plugs $b_1$ and $b_2$ and on the other hand by cotter pins or transverse wedges $d_1$ and $d_2$. In this form of the invention the portions $a_1$ and $a_3$ are formed from soft or low carbon steel.

The screw-threaded spindle $e$ shown in Figure 2 comprises a plain cylindrical portion $f_1$ and a screw-threaded portion $f_2$. The adjacent ends of these portions are each provided with a cylindrical plug $g$, $h$, a sleeve $i$ being provided in which the plugs $g$ and $h$ exactly fit and to which they are connected for rotation by keys $k_1$ and $k_2$. In this form of the invention, both the portions $f_1$ and $f_2$ are formed of hardenable steel and are welded respectively to plugs $g$ and $h$ at E and B.

The portions $a_2$ or $f_2$ of the spindle bearing the screw-thread are formed from hardenable steel, the plugs $b_1$, $b_2$ or $h$ being formed from low carbon steel and are suitably connected by welding as aforesaid with the blank which forms the subsequently screw-threaded portions $a_2$ or $f_2$. In a similar manner the coupling pieces $g$ or $c_1$ and $c_2$ are likewise formed from low carbon steel and may be connected to the corresponding portion of the spindles $a_1$, $a_3$ and $f_1$. After the hardening process, therefore, the coupling pieces remain soft and permit the spindle parts or sections, which are separately machined, to be readily fitted together in a simple manner. In other words, only the threaded portions need be of hardenable steel, but if it is desired, all portions except the coupling pieces can be made of this material.

The spindles illustrated in the drawing are only provided with a single screw-threaded section or zone ($a_2$, $f_2$), but it will be evident that spindles having several such sections or zones can, in a similar manner, be constructed according to the invention. The difficulties which hitherto have prevented the use of hardened and ground screw-threads on spindles of great length are thus overcome by the use of the invention, which renders possible the production of such spindles having lengths of 3000 m. m. and over a comparatively simple manner.

If the screw-threaded section or sections of the long spindle is to consist of case-hardened steel, then in order to obtain, after the hardening, soft coupling pieces, the carbonized layer must be arranged to be removed from the plugs by turning after cementation. In general, however, case hardening on account of the limited depth of penetration obtainable is only employed in cases in which a comparatively fine screw-thread is to be ground on the spindle.

I claim:

1. A relatively long hardened and ground sectional spindle, sections of which are unthreaded and other sections being threaded, at least said threaded sections being formed from hardenable steel, means integral with each section for coupling said sections together at their ends, said coupling means being formed from soft steel.

2. A relatively long hardened and ground sectional spindle, sections of which are unthreaded and other sections being threaded, at least said threaded sections being formed from hardenable steel, means integral with each section for coupling the several sections together at their ends, said coupling means being formed from low carbon steel, said coupling means comprising interengaging plugs and sockets in the contiguously assembled sections, and means for retaining the aforesaid plugs and sockets assembled.

3. A relatively long hardened and ground sectional spindle, sections of which are unthreaded and other sections being threaded, at least said threaded sections being formed from hardenable steel, means integral with each section for coupling the several sections together at their ends, said coupling means being formed of low carbon steel, said coupling means comprising coacting plugs and sockets in the contiguous ends of the assembled sections, and members extending transversely in the sockets and plugs for retaining the parts assembled.

4. A hardened and ground screw-threaded spindle of considerable length, the shaft of which is only provided with screw-threads on one or more portions or zones of its total length, in which at least each screw-threaded portion is formed from hardenable steel, coupling pieces formed integrally with the ends of said portions to connect said portions together, and said coupling pieces being arranged to remain soft after the hardening of said screw-threaded portions so as to enable the mechanical coupling of the portions to be effected after their separate formation, for the purpose specified.

5. A relatively long hardened and ground sectional spindle, at least one of the sections being screw-threaded, the said sections being formed from hardenable steel, means integral with said sections for coupling them together at their ends, said coupling means being of soft steel, the said coupling means being connected to their respective sections by being welded thereto.

6. A relatively long hardened and ground sectional spindle, at least one of the sections thereof being of hardenable steel and being threaded, at least one unthreaded section of low carbon steel, at least one end of said unthreaded section being formed to provide a coupling piece, a coupling piece attached to at least one end of said threaded section and adapted to be coupled with said first named coupling piece, and said second coupling piece being formed of low carbon steel.

7. The structure of claim 6, and said second coupling piece being welded to said threaded section.

ROBERT STOPP.